Nov. 12, 1957  RIKIJIRO OSAKA  2,812,882
COMBINED SALT AND PEPPER SHAKER – CONDIMENT HOLDER
Filed Oct. 14, 1954

INVENTOR.
RIKIJIRO OSAKA
BY
Carl Miller
ATTORNEY

United States Patent Office 2,812,882
Patented Nov. 12, 1957

2,812,882

COMBINED SALT AND PEPPER SHAKER—CONDIMENT HOLDER

Rikijiro Osaka, New York, N. Y.

Application October 14, 1954, Serial No. 462,238

1 Claim. (Cl. 222—142.2)

This invention relates to condiment holders and more particularly to condiment holders adapted to contain two different food substances such as salt and pepper.

It is an object of this invention to provide a condiment holder having two compartments which can be refilled from time to time, as needed, without risk of intermixing the substances contained in each compartment.

Another object of the present invention is to provide a condiment holder, having two compartments, which can be manually opened and closed so as to permit a desired removal of the substances contained therein.

A further object of this invention is to provide a condiment holder of simple and attractive design, which may be manufactured cheaply and marketed at a comparatively low price.

Other and more specific objects of the present invention will be apparent from the following description as read in connection with the accompanying drawing, the novel features of this invention being pointed out in the claims at the end of the specification.

In the drawing, Figure 1 shows a perspective view of one form of the invention with its cover in a closed position.

Figure 2 indicates an exploded perspective view of the various parts of this embodiment of the invention.

Figure 1:
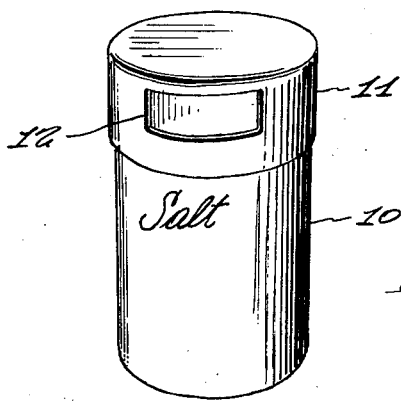
Figure 2:
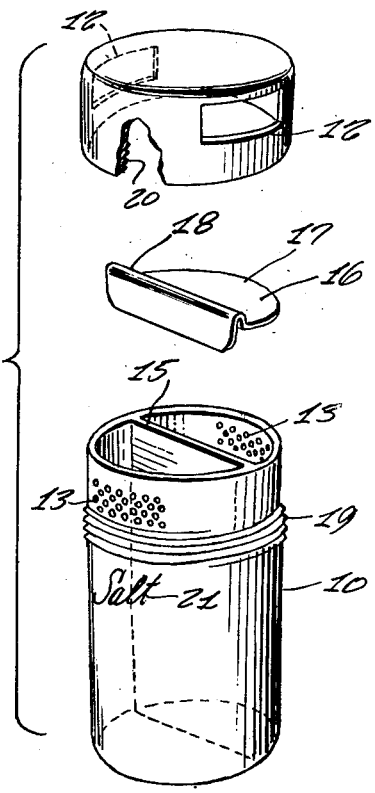
Figure 3:
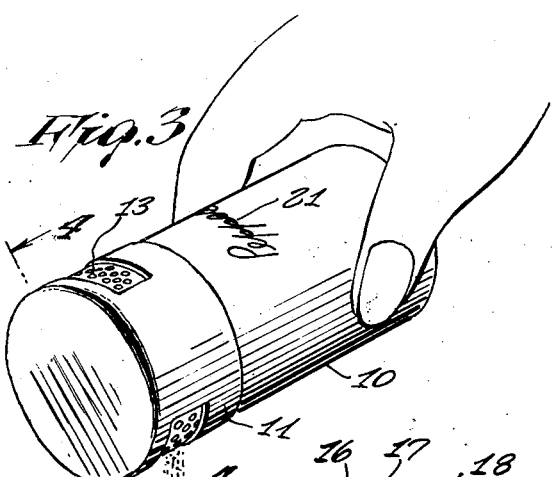
Figure 3 shows a perspective view of this form of the invention when its cover is in an open position and a quantity of the condiment contained therein is being removed by manual shaking.
Figure 4:
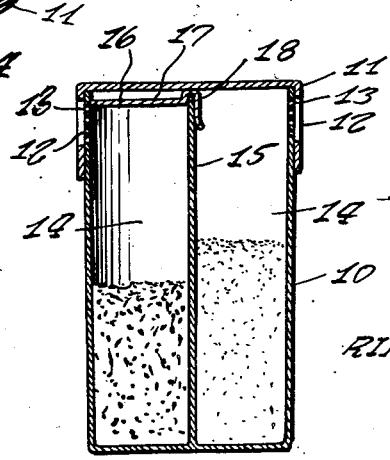
Figure 4 is an elevational cross-sectional view taken about the line 4—4 of Figure 3 and looking in the direction of the arrows located at the ends of that line.

As shown in the drawing, the embodiment of the invention therein illustrated comprises a cylindrical container 10, closed on its lower end and having a rotatable cover 11 on its upper portion. The side of the cover 11 has two oppositely disposed slots 12 located thereon, these slots 12 being turnable so as to expose a plurality of small circular apertures 13 suitably located on the upper portion of the said cylindrical container 10. These apertures 13 are divided into two groups oppositely disposed upon the sides of the said container 10 and of a size sufficient to allow the passage therethrough of a quantity of granular condiment, such as salt or pepper, held within the said container 10. However, when the cover 11 is turned at right angles from this open position, the aforesaid apertures 13 will be blocked so that the escape of any of the said substances will be prevented. The interior of the said container 10 is divided into two compartments 14 by a vertical dividing wall 15 which is integral with the said container 10 and extends from the bottom surface of the container 10 to almost the entire height thereof. Interposed between the top of the said dividing wall 15 and the lower surface of the rotatable cover 11 is located a small sheet metal cover 16 having a horizontal semicircular portion 17 on one end adapted to cover one of the said compartments 14 and a crimped vertical portion 18 adapted to be removably mounted upon the top of the said dividing wall 15.

It is also to be noted that the container 10 and the cover 11 may be composed of any substantially firm material such as metal or plastic and may be mutually secured upon each other by means of an appropriately threaded portion 19 located upon the side of the said container 10 and by a suitably threaded portion 20 located upon the inner vertical surface of the said cover 12 and engageable with the first-mentioned threaded portion 19. The container 10 may also be appropriately marked on its sides with the names 21 of the condiments held within the compartments 14 in the vicinity thereof.

To operate this form of the invention, it is only necessary to rotate the cover 11 so as to expose the apertures 13 and then pour an amount of either of the condiments contained within either of the compartments 14, as desired. When not in use, the container 10 may be closed by simply rotating the said cover 11 to a position at approximately right angles from its open position so as to block the apertures 13. When it is necessary to refill the container 10 with a quantity of either of the condiments contained therein, such operation may be accomplished without risk of any intermixture thereof due to the action of the cover 16 positioned upon one of the said compartments 14. The remaining compartment may thus be filled, as desired, after removal of the outer cover 11. If it is desired to fill the compartment 14 protected by the interior cover 16, the latter may be easily removed manually by exerting a slight upward pressure upon its vertical crimped portion 18 so as to disengage it from the dividing wall 15. The interior cover 16 may then be replaced upon the said dividing wall 15 in a position so as to cover the compartment 14 which it is not desired to fill with condiment, thus leaving open and available for receipt of condiment the remaining compartment 14. When both compartments 14 have been filled to the desired level it is only necessary to replace the cover 11 upon the container 10 leaving the inner cover in place since it in no way interferes with the desired removal of condiment through the openings 13. Moreover, with both the cover 11 and the inner cover 16 in place, there will be no intermixture of the condiments contained in the two compartments 14 since the said interior cover 16 effectively seals each of the said compartments 14 from the other at all times, even during the operation of the condiment holder.

Furthermore, not only does the condiment holder have the advantages described above but it also eliminates the need for separate holders for various condiments such as salt and pepper.

The embodiments of the invention illustrated and described hereinabove have been selected for the purpose of clearly setting forth the principles involved. It will be apparent, however, that the present invention is susceptible of being modified in respect to details of construction, combination and arrangement of parts which may be resorted to without departure from the spirit and scope of the invention as claimed.

Having thus described my invention, I claim as new and desire to secure by Letters Patent of the United States:

A condiment holder comprising, in combination, a cylindrical container comprising integral side and bottom wall and an integral wall dividing the interior thereof into two substantially equal semi-circular compartments, said side wall being perforated adjacent the top edge thereof and in the vicinity of each compartment to provide an exit for granular condiments contained therewithin, said dividing wall terminating below the upper level of said side container side wall, a substantially semicircular cover plate having an inverted J-shaped flange along the straight edge thereof, said plate extending into selective sealing engagement with the side and dividing walls of either of said compartments and said flange extending over the top of said dividing wall thereby isolating one compartment from the other, whereby said plate prevents the entry in one compartment of material being poured into the other compartment, and a rotatable closure removably secured to the top of said container in snug engagement with said side wall and said flange of said cover whereby said cover is retained in position, said closure having a depending peripheral flange having openings at diametrically opposite sides in communication with said respective perforated wall portions.

References Cited in the file of this patent

UNITED STATES PATENTS

| | | |
|---|---|---|
| 847,726 | Brannon | Mar. 19, 1907 |
| 1,215,018 | Grossman | Feb. 6, 1917 |
| 1,284,248 | Crabtree | Nov. 12, 1918 |
| 1,954,719 | Vendel | Apr. 10, 1934 |
| 2,349,724 | Henderson | May 23, 1944 |